United States Patent [19]

Nagy et al.

[11] 4,110,673
[45] Aug. 29, 1978

[54] EXTENDABLE VEHICLE STEP AND STEP MOTOR CONTROL SYSTEM

[75] Inventors: Emery James Nagy, Yoncalla, Oreg.; Rodney A. MacDonald, Palos Verdes Est., Calif.

[73] Assignee: Kwikee Enterprises, Inc., Drain, Oreg.

[21] Appl. No.: 706,539

[22] Filed: Jul. 19, 1976

[51] Int. Cl.² .............................................. H02P 3/08
[52] U.S. Cl. ..................................... 318/466; 280/166; 105/444; 105/447; 318/445; 318/447; 318/484
[58] Field of Search ................ 280/166; 105/444, 445, 105/446, 447; 318/466, 445, 447, 484

[56] References Cited

U.S. PATENT DOCUMENTS

| | | | |
|---|---|---|---|
| 2,118,557 | 5/1938 | Hamilton | 280/166 |
| 3,624,473 | 11/1971 | Robbins | 318/466 |
| 3,833,240 | 9/1974 | Weiler | 280/166 |
| 3,887,217 | 6/1975 | Thomas | 280/166 |

Primary Examiner—Robert K. Schaefer
Assistant Examiner—Leonard W. Pojunas, Jr.
Attorney, Agent, or Firm—James D. Givnan, Jr.

[57] ABSTRACT

A step structure for mobile homes and the like. A base is secured to an underside of the vehicle and serves to pivotally mount a linkage which in turn carries a pair of step rails on which a step is slidably mounted. Extension and retraction of the step involves combined swinging travel of the step surface as well as travel in a lateral direction along the step rails to achieve a highly accessible step location well outward of the vehicle side. An electrical control system electronically limits motor operation to avoid motor burnout in the case of step obstruction.

4 Claims, 4 Drawing Figures

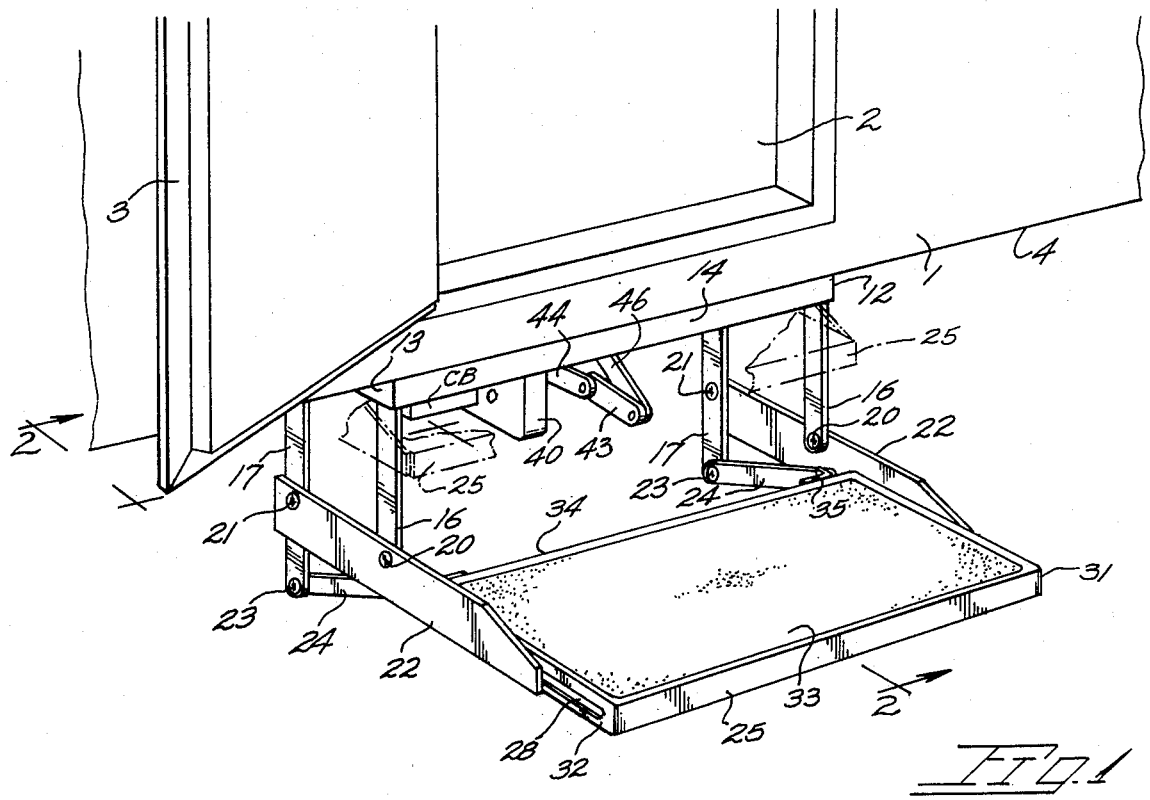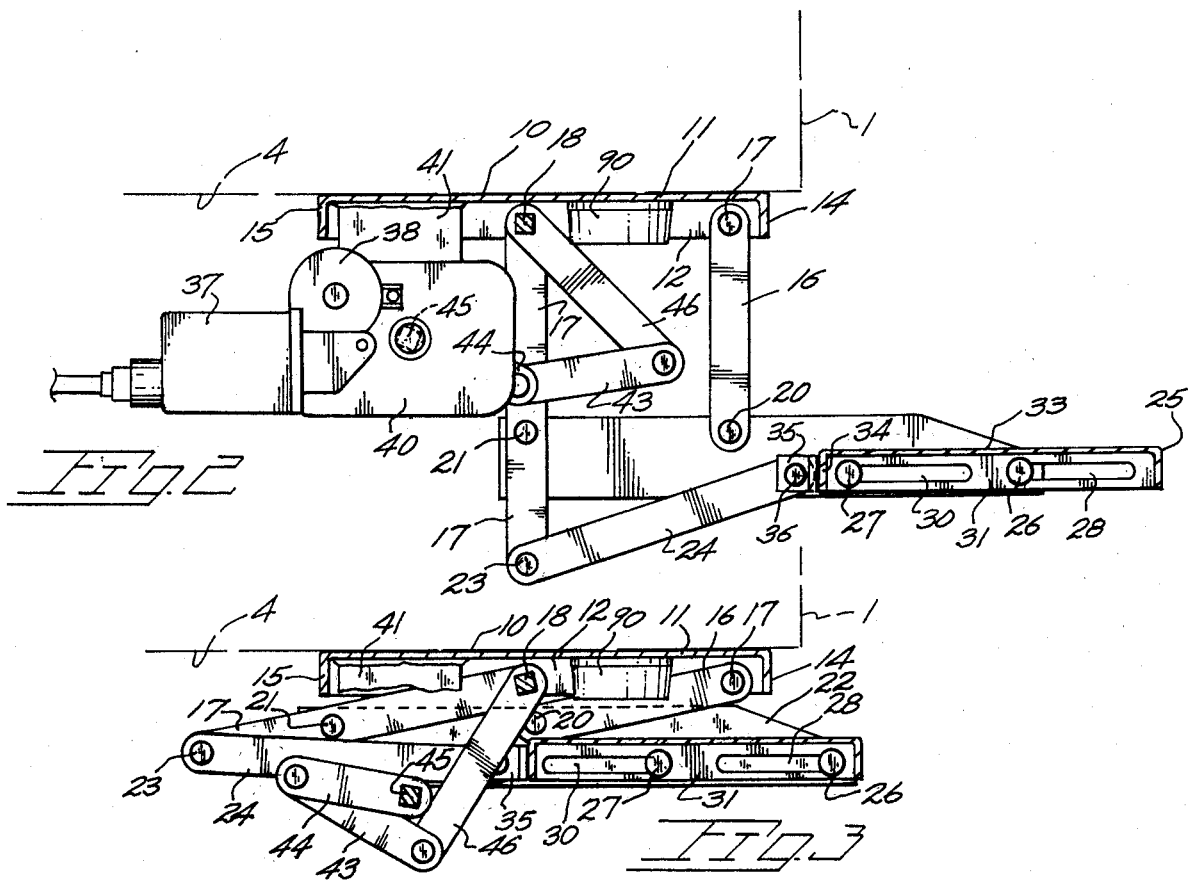

EXTENDABLE VEHICLE STEP AND STEP MOTOR CONTROL SYSTEM

BACKGROUND OF THE INVENTION

The present invention relates generally to extendable steps for vehicles which steps are retracted when the vehicle is underway. More particularly the present invention concerns a step with both hinged and slidable components to provide maximum extension of a step platform so as to be highly accessible to the user. The invention comprehends a solid state electrical circuit for motor control and step positioning.

Steps for recreational vehicles such as motor homes, campers, vans, etc., have included in the past, positionable features to enhance both step function and step stowage when the vehicle is underway. For the most part, such steps have been manually positioned but with some powered steps known in the prior art. A primary drawback to known steps is their limited extension capability resulting in a step having only limited step surface area requiring great care on the user's part in boarding or departing the vehicle.

Further drawbacks reside in such known steps being susceptible to both mechanical and/or electrical failures when normal step extension or retraction is obstructed by a curb or other obstruction. In such instances, continuous motor operation often results in damage to the step powering motor.

SUMMARY OF THE INVENTION

The present invention relates generally to step structure for vehicles and a control system for step positioning. The step structure includes a base for vehicle attachment from which base depends a parallelogram linkage which supports step side members and a step platform slidably carried by said side members. Accordingly the step platform both swings and slides outwardly during extension. Additional to the step structure is a control system providing automatic step positioning upon door opening, step retraction upon door closure and disabling means to leave the step extended when the vehicle is parked. A singal light indicates step position as to the vehicle driver. A locking provision of the step linkage assures against undesired shifting of the step during use. Electronic components of the motor control serve to limit motor operation.

Important objects include: The provision of an extendable step of a compact design for subjacant extension by both swinging and sliding movement from a vehicle in a manner providing ideal step disposition; the provision of a step structure which may be retracted into compact stowed configuration; the provision of a step structure which utilizes a positive locking arrangement to prevent step movement once operatively disposed; the provision of a step structure highly adaptable to installation on recreational or passenger vehicles and incorporating a control system providing automatic step operation with indicators provided to apprise the vehicle operator of step configuration; the provision of a highly reliable, solid state step control system utilizing a timed motor operating circuit to prevent motor damage in case of step travel being obstructed. These and additional objectives will become readily apparent upon an understanding of the following description.

BRIEF DESCRIPTION OF THE DRAWINGS

In the accompanying drawings,

FIG. 1 is a perspective view of an extendable step embodying the present invention operatively disposed beneath a vehicle doorway, FIG. 2 is a vertical sectional view taken approximately along line 2—2 of FIG. 1, FIG. 3 is a view similar to FIG. 2 with the step retracted with the step actuating motor and drive removed for clarity of illustration.

DETAILED DESCRIPTION OF THE PREFERRED EMBODIMENT

Figure 4:
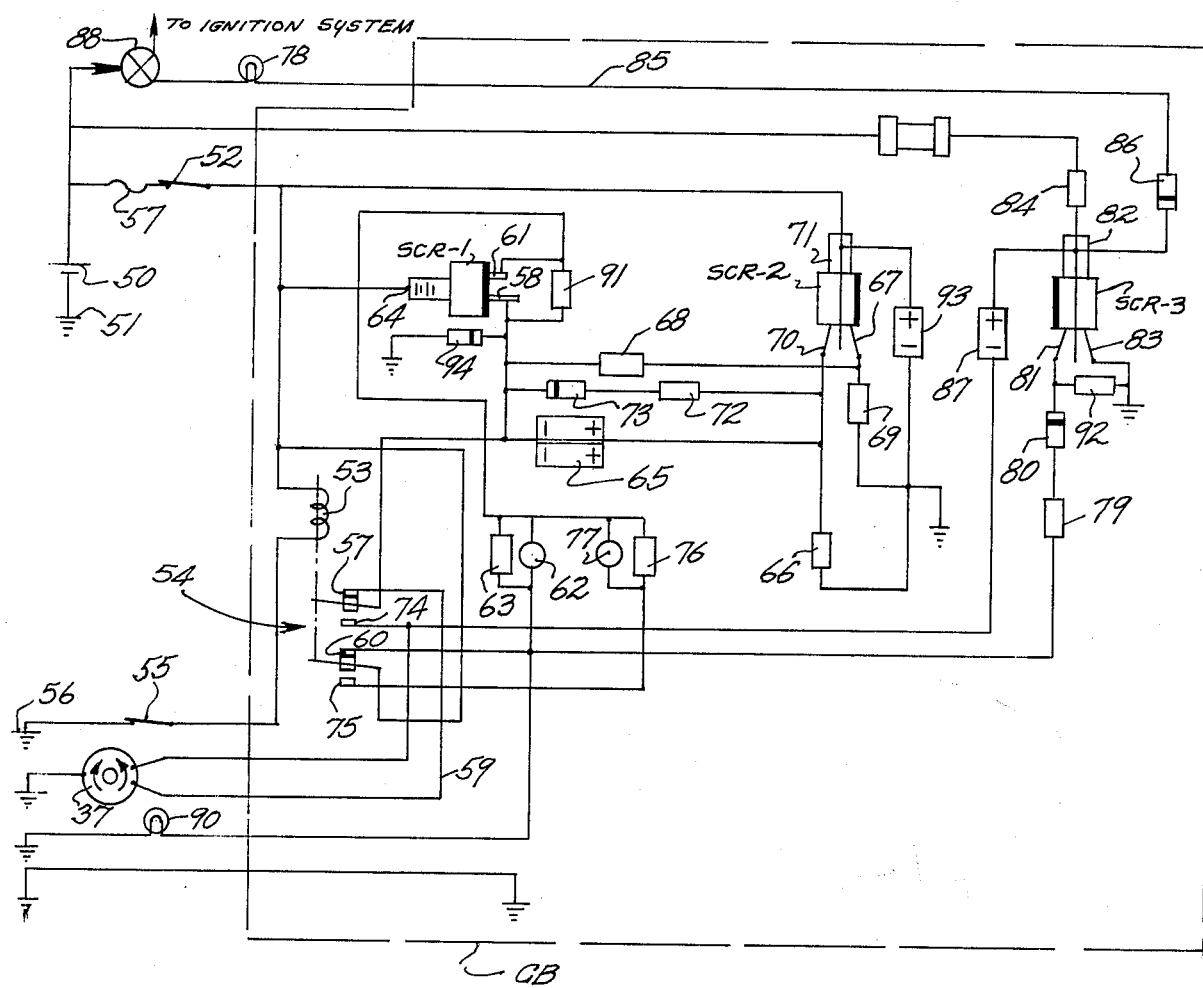
FIG. 4 is a wiring schematic.

With continuing reference to the accompanying drawing wherein applied reference numerals indicate parts similarly identified in the following specification, the reference numeral 1 indicates the wall of a mobile enclosure defining an entry or doorway 2 closed by a door 3. Said enclosure may be in the form of a recreational vehicle such as a motor home, camper or the like or a passenger carrying vehicle to which is mounted the present step along the enclosure's underside indicated at 4.

With regard now to the instant step structure, a supporting base is indicated at 10 which includes a rectangularly shaped weldment including a wall 11 from which depend side flanges 12 and 13 with front and rear flanges 14 and 15 extending there between.

A front pair of links at 16 are pivotally connected at 17 to the inner surfaces of base side flanges 12 and 13. A second or rearward pair of links at 17 are swingably supported at their upper ends to a step actuating rod 18 which is journalled at its ends within suitable bearings carried by base side flanges 12 and 13. Both front and rear pairs of links 16 and 17 are pivotally connected respectively at 20 and 21 to step rails or side members 22 to support same for movement in the manner of a parallelogram linkage. The rearward pair of links 17 each include lowermost arm portions extending downwardly from pivots 20 and 21 and beyond said step side members 22 to pivotally receive at 23 the rearward ends of a pair of step extension links 24.

A step platform at 25 extends intermediate step side members 22 and is slidably supported thereon by front and rear guides 26 and 27 which cooperate with elongate openings 28 and 30 formed within side flanges 31 and 32 of the step platform. A step surface is indicated at 33. Affixed to a rear flange 34 of the step platform are a pair of ears 35 having rearwardly directed portions which pivotally attach, at 36, step extension arms 24.

Links 16 and 17 operate as a parallelogram linkage to raise and lower side members 22 with the lower portion of rearward linkage 17 additionally serving to slide step platform 25 lengthwise along the step side members.

Step actuating means includes a motor indicated at 37 which powers the movable step structure through reduction gearing housed at 38 with additional gear reduction components housed at 40. The latter housing is in bolted engagement with a vertical mounting plate 41 suitably secured to the underside of the step base 10. Step actuating rod 18, journalled at its ends within side flanges 12 and 13 of the base, is rotated by a crank arm 44 carried by a transmission output shaft at 45 and articulated linkage at 43 and 46. Crank arm 44 moves through somewhat less than 180 degrees of travel during step positioning and approaches an aligned relationship with linkage 43 when the step is extended to securely retain the step 25 against shifting during use.

The control circuit shown in FIG. 4 controls direct current powered, low voltage motor 37 to extend and retract step 25. Solid state electronic components accurately time motor operation during both extension and step retraction. Should the step become stalled during such travel, the electronic circuit will "time out" and terminate motor operation thereby eliminating the risk of motor burnout or step damage. During normal step operation, power to drive motor 37 is terminated by the electronic circuit as the step reaches its extreme positions. An extended step position is signaled to the vehicle operator by a warning light to prevent inadvertent travel of the vehicle with the step extended. Upon entrance door 2 being closed (and a kill switch being closed) the step will automatically retract upward to a safe travel position as later described.

A battery source at 50 may be the vehicle battery of 12 volts D.C. grounded at 51. A single-pole, single-throw switch at 52 termed a kill switch by reason of its disabling function, puts an actuating coil 53 of a relay 54 in circuit with battery 50. A door actuated single-pole, single-throw switch 55 completes the relay circuit to a ground 56 when vehicle door 3 is in an open (switch closing) position. A fuse 57 protects the relay circuit. Kill switch 52 must be closed as must door switch 55 (door open) to actuate the relay for step extension from its normally retracted or up position. Upon entrance door 3 being opened, relay coil 53 is energized to draw the relay armature upward closing normally open contacts 57. Closed relay contacts 57 connect one winding of drive motor 37, via a motor lead 59, to the cathode 58 of semiconductor controlled rectifier SCR-1. Simultaneously current moves via other relay contacts at 60 through a capacitor 62 and rectifier 63 to a gate 61 of SCR-1. The current applied to gate 61 permits current to flow through SCR-1 from its anode 64 to cathode 58, through relay contacts 57 to drive motor 37 in a step lowering direction. The length of drive motor operation is controlled by the amount of electric charge imparted to a capacitor at 65 which charge is partially discharged through a resistor at 66. During this timed interval of motor operation a small positive voltage is present on a gate 67 of a second semiconductor controlled rectifier at SCR-2. This voltage is also supplied from the cathode 58 of rectifier SCR-1 via a resistor 68 which voltage is held to a constant value by a second resistor 69. When capacitor 65 discharges and the positive voltage on cathode 70 of SCR-2 is reduced, the gate thereof 67 will trigger to connect the anode 71, of SCR-2 (having a potential of plus 12 volts) to cathode 70. The positive side of capacitor 65 is connected to cathode 70 of SCR-2 resulting in the cathode being charged to a high positive potential. Such recharging causes the cathode 58 to become momentarily negative and thereby commutated to an off condition. When recitifer SCR-1 is deactivated, power ceases to flow to drive motor 37. All residual voltage in capacitor 64 is quickly discharged through resistor 72 and a diode 73.

Conversely, when the door 3 is closed, door switch 55 is opened and the relay returns to its normal position. To prevent step retraction kill switch 52 is left open to disable the motor while the vehicle is parked. Assuming kill switch 52 is closed and door switch 55 is open the armature of relay 54 will be at its normal or lower position with armature actuated contacts at 74 setting up a second circuit to reversible motor 37. Armature actuated contacts at 75 close a circuit to the gate 61 of SCR-1 to trigger same with current flow being through a resistor 76 and a capacitor 77. The electronic action as above described occurs with the step being retracted by motor operation in an opposite direction which operation is terminated after the above described electronic cycle is once again completed. Should step travel be obstructed, the timed interval will interrupt the circuit to terminate drive motor 37 operation thereby eliminating motor burnout. This circuit is believed novel as rectifier SCR-1 is truned off by negative voltage being applied to its cathode 58 rather than to its anode as is common.

A warning light circuit illuminating a dashboard warning light 78 is closed, when the step is extended, via the gate of a third semiconductor controlled rectifier SCR-3. Current moves through relay contacts 60 through a rectifier 79 and a diode 80 to the gate 81 of SCR-3. Accordingly current passes between anode 82 and cathode 83 of SCR-3. Cathode 83 is at ground potential. A slight current flow through a resistor 84 keeps rectifier SCR-3 operating and connected to the grounded cathode. Upon ignition key switch 88 being turned on, current will flow through warning light 78 to the control unit via conductor 85, through a diode 86 to the anode of SCR-3 which is connected to ground by cathode 83. This supplies a path to ground for the warning light and it will glow as long as this condition exists. When door 3 is closed and the step is retracted upward, the relay returns to it's normal position with contacts 60 open and gate voltage being removed from rectifier SCR-3. During this instant a high positive voltage is present on the plus side of a capacitor 87. This drives the small plus voltage on the anode of rectifier SCR-3 negative and turns it off. The warning light is now inoperative. Other various resistors at 91, 92, capacitor 93 and diode 94 in this circuit are essential components in the design of the electronic control.

A step illumination light at 90 is on during step extension and upon closure of kill switch 52.

Values of the electronic components are provided as follows:

| Resistors 68 & 69 | 33 | OHM | ½ Watt |
|---|---|---|---|
| Resistors 72 & 84 | 230 | OHM | ½ Watt |
| Resistors 63 & 76 | 4.6 | M.OHM | ½ Watt |
| Resistors 91 & 92 | 100 | OHM | ½ Watt |
| Resistor 66 | 680 | OHM | ½ Watt |
| Resistor 79 | 150 | OHM | ½ Watt |
| Capacitor 65 | 2000 | MFD | 16 Volt |
| Capacitor 87 | 50 | MFD | 16 Volt |
| Capacitor 93 | 1 | MFD | 16 Volt |
| Capacitors 62 & 77 | .047 | MFD | 50 Volt |
| SCR-1 25 A. | | | 25 Volt |
| SCR-2, SCR-3 4 A. | | | 200 Volt |
| Relay 10 A. | DPDT | | 12 VDC |

While we have shown but one embodiment of the invention it will be apparent to those skilled in the art that the invention may be embodied still otherwise without departing from the spirit and scope of the invention.

Having thus described the invention what is desired to be secured under a Letters Patent is:

1. A positionable step for vehicles, said step comprising,
   a base adapted for attachment to the vehicle,
   a step extensible from a stowed position beneath the base to an extended position whereat the step is downwardly and outwardly offset from the vehicle, step support members swingably postionable from a stowed position beneath the base, cooperating means carried by said step and said support members and slidably supporting the step for lengthwise travel along said support members during step extension and retraction, front and rear pairs of links coupling said step support members and said step to the base so as to permit swinging movement of the step and step support members, said rear pair of links each including lowermost arm portions imparting sliding motion to said step for travel lengthwise along said support members, and step actuating means carried by said base including a reversible electric motor in driving connection with the rear pair of links and a motor control system operable to determine fixed intervals of motor operation constituting step extension and retraction regardless of stalling of the motor by a step obstruction, said motor control system includes semiconductor controlled rectifiers, one of said rectifiers having its cathode in a switch controlled circuit with said motor, capacitor means in circuit with said cathode of said one rectifier, said capacitor means discharging after a predetermined period to momentarily change the charge on said cathode to a negative charge thereby terminating said one rectifier operation to open said circuit to the motor after the predetermined period.

2. The motor control system claimed in claim 1 wherein the motor control system includes a relay, switch means actuated by said relay and having contacts in circuit with a pair of motor windings to sequentially affect motor operation in opposite directions, first semiconductor switch means in circuit with a power source and with said motor via said relay switch means, second semiconductor switch means in circuit with a power source, capacitor means in circuit with a power source via the cathodes of both of said semiconductor switch means, said capacitor means receiving a positive charge during the operation of said first semiconductor switch means during motor operation, momentary discharge of said capacitor means causing the closure of a circuit through said second semiconductor switch means resulting in a momentary positive potential on said capacitor means to reverse the charge on the cathode of said first semiconductor switch means to commutate same to an off condition to terminate motor operation.

3. The motor control system claimed in claim 2 additionally including resistor means in series with one side of said capacitor means and with a ground connection whereby the rating of the resistor affects the duration for buildup and discharge of said capacitor means and accordingly the timed interval of motor operation.

4. The motor control system claimed in claim 3 wherein said reversible motor is internally grounded, said first and second semiconductor switch means are semiconductor controlled rectifiers having their anodes in circuit with a power source, the gate of said first rectifier in circuit with a power source through said relay switch means.

* * * * *